W. Clemson.
Tempering Saws.
Nº 11,857.    Patented Oct. 31, 1854.
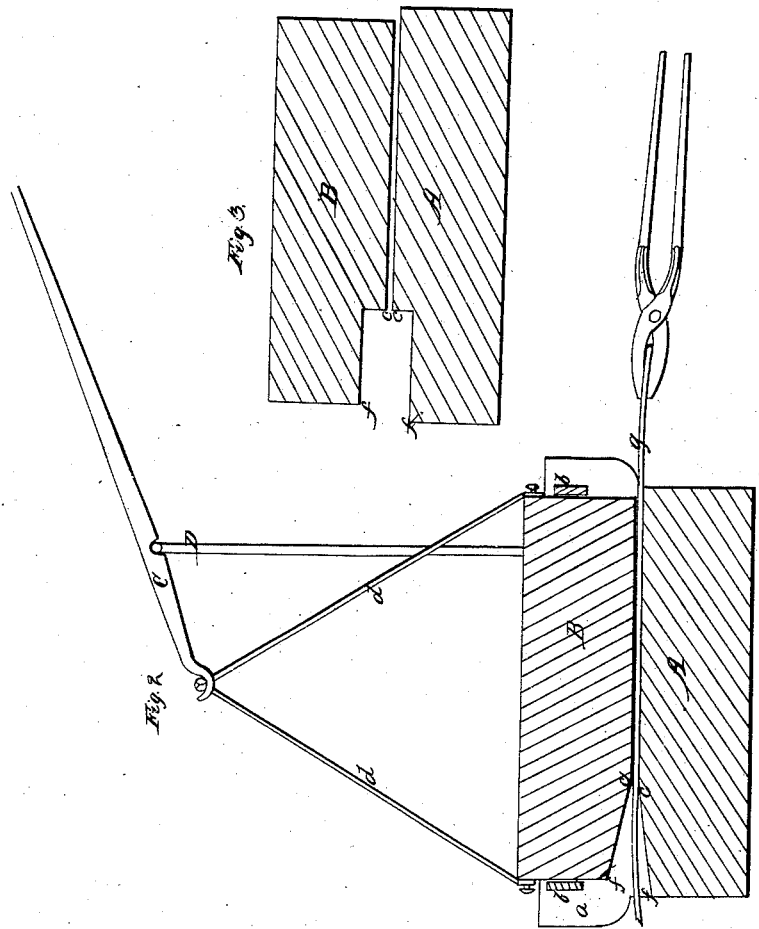

UNITED STATES PATENT OFFICE.

WILLIAM CLEMSON, OF BOSTON, MASSACHUSETTS.

APPARATUS FOR TEMPERING AND FLATTENING SAWS.

Specification of Letters Patent No. 11,857, dated October 31, 1854.

*To all whom it may concern:*

Be it known that I, WILLIAM CLEMSON, of Boston, in the county of Suffolk and State of Massachusetts, have invented a new and useful Improvement in Apparatus for Tempering and Flattening Hardened Saws; and I do hereby declare that the following is a full, clear, and exact description of the same, reference being had to the accompanying drawings, forming part of this specification, in which—

Figure 1, is a front view of an apparatus constructed according to my invention. Fig. 2, is a longitudinal vertical section of the same through the center. Fig. 3, is a longitudinal sectional view, showing a modification of my invention.

Similar letters of reference indicate corresponding parts in the several figures.

The apparatus which I employ for tempering and flattening saws, consists of two iron plates placed horizontally one above the other, above a fire place of suitable construction, to heat them to a proper degree. The tempering and flattening of the saw, are both effected at the same time by drawing it through or between the heated plates; the tempering being effected by the heat it absorbs from the plates, and the flattening by the weight of the upper plate. The hardened saw requires to be heated to a certain degree, before being drawn through the plates, but if not sufficiently heated, it will break on being drawn through, and if too much heated it will spring back to its original unevenness after being drawn through; therefore with a view to the heating of the saw to the proper degree, my invention consists in beveling those ends of the plates, where the saw enters between them, or otherwise enlarging the entrance between the plates, so that before being subjected to the pressure of the upper plate, every part of the saw shall become heated by radiation from the beveled or receding parts of the plates.

A, is the lower plate which is of cast iron, cast with side pieces ($a$, $a$) to form guides for the upper plate B, which is also of cast iron. Both of the plates are planed flat on the whole of their opposite faces, except from ($c$, $c$) to the nearest or front end ($f$) which parts I make beveled as represented in Fig. 2, though they may recede suddenly, as shown in Fig. 3. The lower plate is intended to be built over a fire grate, so that it may be heated at a dull red heat. The upper plate rests upon the lower one, and is prevented moving longitudinally upon it by cross pieces ($b$, $b$) dropped into grooves in the side pieces ($a$, $a$) and is furnished with a yoke ($d$, $d$) to enable it to be raised by a lever, C, whose fulcrum is a movable bridge piece, D, striding over the plate, B, and resting on the side pieces ($a$, $a$).

To introduce the saw ($g$,) between the plates, the upper plate requires to be slightly raised, and the saw is entered at the beveled or opening end ($c$) and slowly pushed through until enough of it protrudes at the opposite end to be seized with a pair of tongs, or other suitable grippers, when the upper plate is let down upon it. The whole of the saw is then drawn by the tongs through the plates, the speed at which it is drawn, depending upon the temper to be given, and being left at the discretion of the workman. It will be understood that every part of the saw before receiving the pressure of the plates will be heated by radiation from the plates, in passing between the bevels or recesses in front of the points ($c$, $c$).

The size of the plates A, B, may be varied according to the size of the saws, but for general use, I have employed successfully, plates about 14 inches long and 8 inches wide, with the bevels extending about four inches from the end. The upper plate should be made light enough to give the requisite pressure for flattening the lightest saws, as its pressure may be increased, to any desired degree for heavier saws, by placing weights on the top. Both plates will require re-planing when they are badly worn in ridges and furrows by the movement of the saws.

What I claim as my invention and desire to secure by Letters Patent is,

Making those ends of the plates which the saw enters, with their faces of beveled or other receding form, substantially as shown at ($c$, $f$) whereby they are enabled to impart heat to the saws, by radiation before as they enter, and thus cause every part of the saw to be heated to a proper degree, before being submitted to the pressure of the upper plate, substantially as herein set forth.

WILLIAM CLEMSON.

Witnesses:
GEO. W. MINNS,
R. W. HENSHAW.